UNITED STATES PATENT OFFICE.

VICTOR G. BLOEDE, OF BALTIMORE, MARYLAND.

COMPOSITION OF MATTER TO BE USED FOR THE MANUFACTURE OF ENVELOPS AND THE GUMMING OF PAPER.

1,268,672.   Specification of Letters Patent.   Patented June 4, 1918.

No Drawing. Application filed April 19, 1916, Serial No. 92,225. Renewed March 25, 1918. Serial No. 224,652.

*To all whom it may concern:*

Be it known that I, VICTOR G. BLOEDE, a citizen of the United States, residing at Baltimore, State of Maryland, have invented a new and useful Composition of Matter to be Used for the Manufacture of Envelops and the Gumming of Paper, of which the following is a specification.

My composition consists of the following ingredients, combined approximately in the proportions stated, viz:

100 to 160 pounds of hydrolyzed starch, known as dextrin, or envelop gum.

100 pounds of water.

One-half pound to five pounds of concentrated liquid sulfite, or bisulfite of an alkali, or its equivalent in sulfurous acid.

These ingredients are blended cold, and preferably allowed to stand for some hours, after which the mixture is brought to the boiling point, and boiled for a few minutes, or until complete solution has taken place, and the composition has assumed the clearness, and approximately the consistency of honey.

My invention has for its purpose the production of an improved liquid envelop gum, or solution of dextrin, for envelop making, or the gumming of paper, and consists of acting upon the artificial or starch gums by sulfurous acid, or the sulfite or bisulfite of an alkali, as stated.

The product, known in commerce as "envelop gum" consists of starch hydrolized or dextrinized in various degrees.

They vary considerably in physical properties, according to the base from which they are made, and the character and extent of the hydrolyzation, but whether made from potato, corn, tapioca, sago, wheat, or other forms of starch, are all classed in the category of artificial gums or dextrins.

I have found that by acting upon any of these products with sulfurous acid or its compounds during the process of solution a product very superior in working qualities, color and clearness is obtained as against the method ordinarily employed of dissolving these artificial gums in pure water.

To carry out my invention, I proceed as follows: I take from 100 to 160 parts of dry envelop gum or dextrin, according to the degree of hydrolyzation, and the thickness or viscosity desired in the finished product. This gum I sift into 100 pounds of water, to which from one-half pound to five pounds of a concentrated solution of sulfite or bisulfite of the alkalis has been added. This mixture is then stirred until a perfectly smooth paste has been formed, free from any lumps or clots of undissolved gum, and preferably allowed to stand over for a few hours, after which it is transferred to a suitable kettle or boiler, provided with a mechanical agitator, and heated to the boiling point, the heat being continued until complete solution has taken place and the gum has assumed a clear, honey-like consistency, when upon cooling to normal temperature, it is ready for use.

The best apparatus for preparing such gum, and the one now in general use, consists of a steam-jacketed copper kettle provided with a mechanical stirrer, and in such an appliance the entire operation of the preliminary mixing of the cold water and bisulfite solution, and subsequent boiling can be performed without extra handling or transfer of any of the material.

Not only are the mechanical working properties of the liquid gum very largely improved by the action of sulfurous acid, but the solubility, color and clearness of the solution is greatly improved, resulting in a much brighter and more glossy surface covering on the paper to which the gum is applied than when water without the addition of sulfurous acid, or a sulfite, is used as in the ordinary method.

I can produce a similar effect by treating the envelop gum with sulfurous acid in the free state, that is to say, uncombined with soda or another alkali, but this does not produce quite so satisfactory results, cannot be so readily, or conveniently applied, owing to its volatile character, and has the further objection of leaving the prepared or liquid gum in a strongly acid condition, wherefore in practical working, I prefer to use the sulfite or bisulfite of an alkali, and preferably as stated, the bisulfite of soda.

The exact chemical reaction by which the improvement in the working qualities of the starch gums or dextrins, by the addition of sulfurous acid or an alkaline sulfite is brought about has not been definitely determined, but seems to be due to some solvent action of the sulfurous acid on some of the less soluble, less converted or suspended substances contained in the somewhat complex starch gums or dextrins.

Nearly all of these artificial gums or hydrolyzed starch products, as found in commerce, possess an acid reaction, and when brought in contact with the sulfites of the alkalis, liberate nascent sulfurous acid in the body of the mixture, which in addition to exerting a bleaching action upon the coloring matter contained, also as stated, largely increases the solubility of certain elements in the artificial gums.

I am aware that sulfurous acid under pressure has been used in the primary hydrolyzation of starch, as well as in the production of glucose, and I do not claim this process for the conversion or hydrolyzation of starch, my invention being confined to the action of sulfurous acid and its compounds upon the already fully hydrolyzed starch compounds now in common use for adhesive purposes, thereby greatly improving their working qualities, solubility, color and flow for envelop making and the gumming of paper.

An envelop gum made by my process has a much smoother, more uniform and clear body, as well as better flowing and spreading qualities than the ordinary solutions now in general use, and for these reasons produces better, as well as more economical results in practical work.

I do not, of course, limit myself to the exact proportions of gum and water used, nor to the exact proportion of bisulfite of soda, as the proportions given may be largely varied, according to the character of the artificial gum used in the preparation of the solution, as well as the purposes for which the product is used.

What I claim is:

1. The composition herein described consisting of a starch gum dissolved in water containing sulfurous acid sufficient in amount to correspond to from one-half to five per cent. of bisulfite of soda, substantially in the manner and for the purpose specified.

2. The composition herein described consisting of a starch gum dissolved in water containing from one-half to five per cent. of bisulfite of soda substantially in the manner and for the purpose specified.

VICTOR G. BLOEDE.